Nov. 21, 1967  A. P. PERRIN  3,353,918
APPARATUS FOR MANUFACTURING MOULDABLE URETHANE FOAMS
Filed Oct. 24, 1963  2 Sheets-Sheet 1
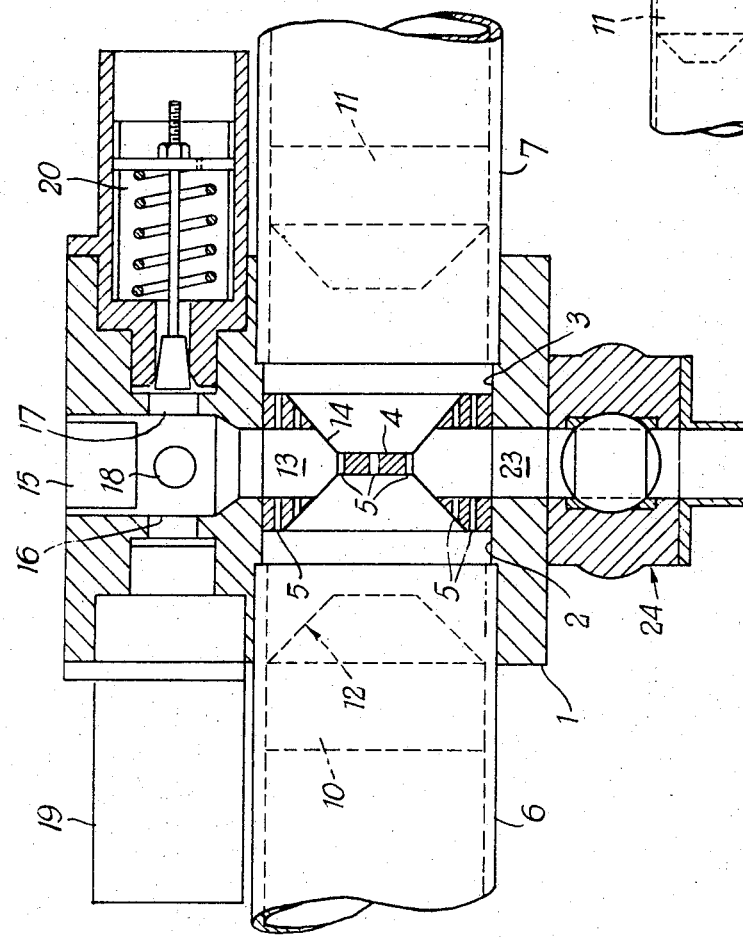
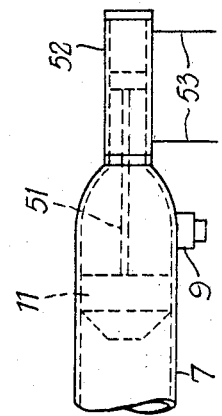

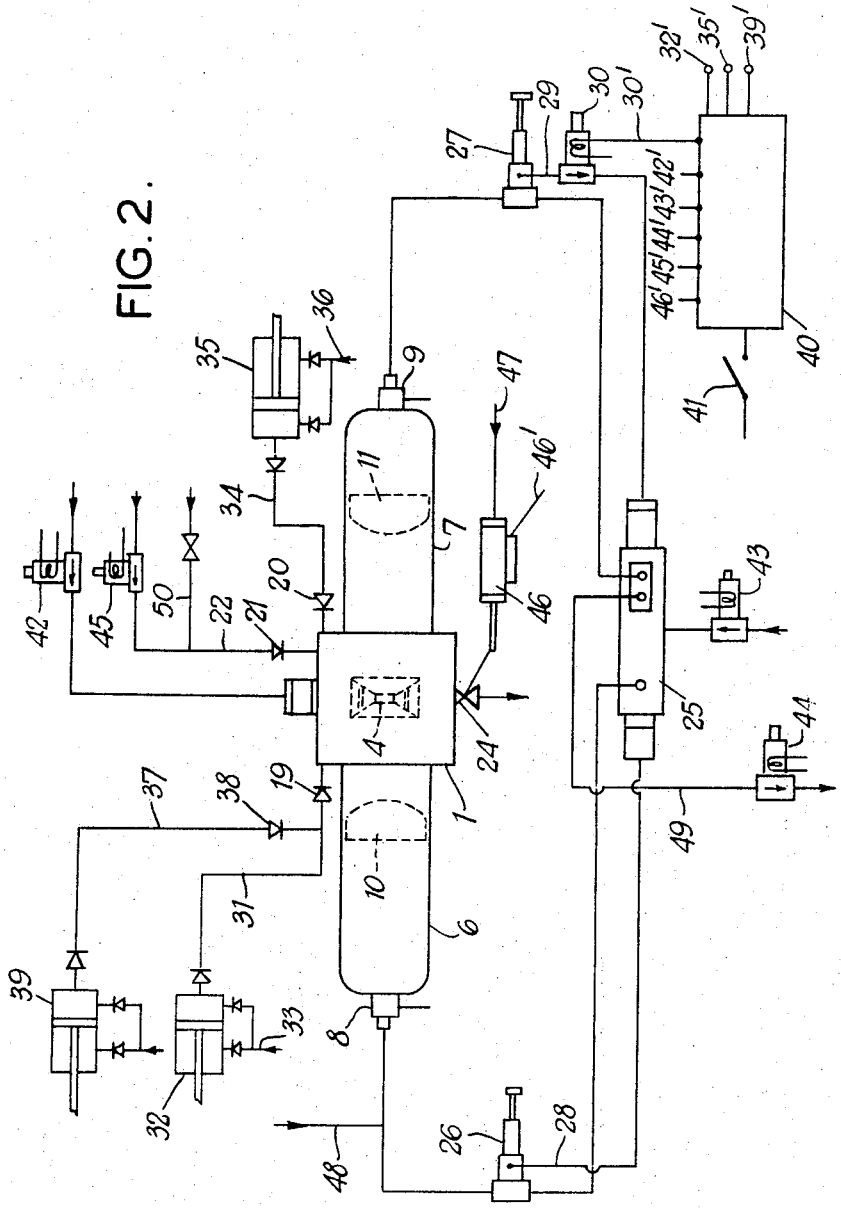

United States Patent Office 3,353,918
Patented Nov. 21, 1967

3,353,918
APPARATUS FOR MANUFACTURING MOULD-
ABLE URETHANE FOAMS
Alan Philip Perrin, 100 Harleyford Road,
London SE. 11, England
Filed Oct. 24, 1963, Ser. No. 318,748
Claims priority, application Great Britain,
Oct. 25, 1962, 40,492/62
16 Claims. (Cl. 23—252)

This invention relates to the manufacture of moulded urethane foams and is concerned more particularly with an apparatus for and a method of mixing ingredients, for example the ingredients of such foams.

To produce urethane foam it is necessary to combine, in the right proportions, polyol, catalysts and a diisocyanate. When a diisocyanate is mixed with the other ingredients, urethane foam is produced in a very short time, i.e. in the region of 10 to 20 seconds. It will be seen therefore that the ingredients are difficult to handle, more specifically whilst mixing and discharging them into some mould.

It is an object of the present invention to provide means for handling the ingredients of urethane foam.

In accordance with one aspect of the invention there is provided an apparatus, for mixing ingredients for example for the manufacture of urethane foam, comprising a mixing device containing two chambers having adjacent ends interconnected by a plurality of openings and two pistons each slidably mounted in a respective one of the chambers, the arrangement being such that the pistons may be oscillated within the chambers to force any ingredients in the mixing device back and forth through the openings to effect mixing of the ingredients.

In accordance with another aspect of the invention there is provided a method, for mixing ingredients for example in the manufacture of urethane foam, comprising the step of dispensing the ingredients into a mixing device containing two chambers having adjacent ends interconnected by a plurality of openings, and the step of oscillating two pistons, each slidably mounted in a respective one of the chambers, to force the ingredients back and forth through the openings to effect mixing of the ingredients.

For a better understanding of the invention and to show how the same may be carried into effect reference will now be made by way of example, to the accompanying drawings, in which, FIGURE 1 shows a partial cross-section of a mixing device for ingredients for the manufacture of urethane foam, FIGURE 2 shows an apparatus, incorporating the device of FIGURE 1 for manufacturing urethane foam, and FIGURE 3 illustrates a modification to the device of FIGURE 1.

In FIGURE 1 there is shown a mixing device, for the ingredients for the manufacture of urethane foam, comprising a block 1 containing first and second coaxial circular cross-section holes 2 and 3 which are formed in opposed sides of the block, the extent of the holes being such that the inner ends thereof are separated by a partition 4, herein termed a breaker plate. The braker plate 4 contains a plurality of passages 5 interconnecting the two coaxial holes 2 and 3 each of which holes is extended externally of the block by a cylinder, 6 and 7 respectively, so as to form two opposed equal volume chambers the outer ends of which are terminated in ducts provided with quick exhausting valves represented diagrammatically at 8 and 9 in FIGURE 2. First and second freely slidable pistons 10 and 11 are disposed one in each of the respective chambers defined by cylinders 6 and 7 and holes 2 and 3. The profile of each piston is shaped, as at 12, to correspond with the opposed surfaces of the breaker plate 4.

This breaker plate 4 has a central apertured plate and an outer annular portion increasing in width radially and provided with passages.

The block also contains an inlet duct 13 disposed at right angles to the axis of the coaxial holes 2 and 3 and communicating therewith by way of apertures 14 in the breaker plate 4.

An isolating piston 15 is slidably disposed in the inlet duct 13 and is arranged, when displaced in the duct towards the plate 4 to isolate the holes 2 and 3 in the block from ports 16, 17 and 18 in the inlet duct 13 and, when withdrawn, to permit entry to the block of liquid from ports 16, 17 and 18. Two ports, 16 and 17, communicate with pressure operated non-return valves 19 and 20 respectively. The third port 18 permits the entry of compressed air and a solvent for cleaning purposes, a pressure operated non-return valve 21 being incorporated in a line 22 communicating with this port 19 (FIGURE 2).

An outlet duct 23 of the block 1 is disposed opposite the inlet duct 13 and is provided with a pneumatically operated ball-type let-down valve 24. Communication between the outlet duct 23, the inlet duct 13 and the coaxial holes 2 and 3 is effected by way of the arrangement of passages 5, 13 and 23 in the breaker plate 4.

To achieve mixing of ingredients within the block 1 and in the cylinders 6 and 7 the freely slidable pistons 10 and 11 must reciprocate back and forth in the cylinders. For this purpose an auto valve 25 (FIGURE 2) is provided which is arranged on actuation to direct compressed air alternately behind the pistons 10 and 11, via the quick exhausting valves 8 and 9, to effect displacement of the pistons. Alternate actuation of the pistons in this way causes mixing of any ingredients contained in the block and cylinders by rapidly passing the ingredients back and forth through the passages 5 in the breaker plate 4. To actuate the auto valve 25 unloaders 26 and 27 are disposed in compressed air lines between the auto valves 25 and the quick exhausting valves 8 and 9, the unloaders being arranged to apply, via subsidiary air lines 28 and 29, a signal to the auto valve 25 to reverse the operation thereof when the required pressure has built up in the associated cylinder. Disposed in the subsidiary air line 29, by which the unloader 27 associated with the piston 11 signals the auto valve 25, is a solenoid operated valve 30 arranged to stop, when required, the interconnected operation of the unloader 27 and the auto valve 25.

The non-return valve 19 is disposed at one end of a pipe line 31 from a positive displacement piston pump 32 which is connected to a polyol source 33. Similarly, non-return valve 20 is connected at one end of a pipe line 34 connected to a positive displacement piston pump 35 connected to a toluene diisocyanate source 36. Connected to the polyol pipe line 31 between the non-return valve 19 and the piston pump 32 is a catalyst pipe line 37 terminating in a pressure operated non-return valve 38 and a positive displacement pump 39.

A control unit 40 is provided to control the apparatus on actuation of a switch 41 and has outputs 32′, 35′ and 39′ for controlling piston pumps 32, 35 and 39 respectively. Outputs 30′, 42′ to 46′ are also provided to control solenoid operate valve 30 and valves 42 to 46. Valve 42 controls the supply of air to the isolating piston 15, valves 43 and 44 control the supply of air to the auto valve 25, and valve 45 controls the flow of air to port 18. An output 46 is connected to a let-down valve operating cylinder 46 in a compressed air line 47. On actuation of the switch 41 the sequence of operations to be now described are automatically effected.

In operation, initially the freely slidable piston 11 will be held against the breaker plate 4 of the mixing block 1 by air pressure in the associated cylinder 7. In this initial condition the unloader 27 is prevented from actuating the auto valve 25 by virtue of the fact that the subsidiary air line 29 from the unloader 27 to the auto valve 25 is closed by the solenoid operated valve 30. Also the let-down valve 24 is held closed and the isolating piston 15 in the inlet duct 13 is withdrawn to open the mixing block 1 to ports 16, 17 and 18.

On actuating the control unit 40 a predetermined amount of catalyst is dispensed, by the positive displacement piston pump 39, from primed catalyst line 37 into the polyol inlet line 31 which has previously been primed to the polyol non-return valve 19. Thus, a volume of polyol equal to the volume of catalyst discharged is displaced via the polyol non-return valve 19 into the mixing block 1. Immediately following the injection of the catalyst, polyol is dispensed by the polyol piston pump 32 via the non-return valve 19 to the mixing block 1, this action also purging the catalyst into the block. This is followed by the dispensing of toluene diisocyanate from primed line 34 by means of the positive displacement piston pump 35. It will be seen that, by the use of such pumps, predetermined amounts of ingredients may be dispensed. The liquid entering the mixing block 1 displaces the freely slidably piston 10, which at this stage is not subjected to air pressure.

When all the ingredients have been dispensed the isolating piston 15 is immediately actuated to close the inlet duct 13 thereby sealing the block and cleaning the walls of the inlet duct, firstly to ensure that all the ingredients are displaced into the mixing region of the block and secondly to prevent the formation of foam in the inlet duct.

The solenoid valve 30 is then opened to allow the associated unloader 27 to signal the auto valve 25 which then reverses the direction of air flow and thus causes the previously non-pressurized piston 10 to be displaced towards the breaker plate 4. The mixture in the cylinder 6 between the plate 4, and the piston 10 is thereby forced through the plate 4 until the piston 10 strikes the plate 4 whereupon the build up of pressure behind the piston 10 causes the associated unloader 26 to signal the auto valve 25, thus again reversing the operation. This process repeats causing the freely slidable pistons to oscillate back and forth until such time as the solenoid operated valve 30 is again closed.

The rate at which the pistons 10 and 11 travel during the mixing period, and therefore the speed at which the liquid is forced back and forth through the breaker plate 4, determines to a great extent the cell size in the resulting foam. It will be seen that the cell size can be readily adjusted with this mixing arrangement by adjusting the available air flow and pressure.

Owing to the rapid formation of foam when the ingredients are combined, the mixing time, determined electronically by the control unit 40, is about 2 to 3 seconds. After this time interval the solenoid valve 30 in the subsidiary air line 29 is closed thus halting the reversing action of the auto valve 25 and hence stopping the mixing. At this point it will be seen that the piston 11 is held against the breaker plate 4 by air pressure whilst the piston 10 is cut-off from the compressed air supply.

To discharge the mixed ingredients the let-down valve 24 is opened and, at the same time, the piston 10 is urged towards the breaker plate 4 by air pressure from an auxiliary air line 48, thus forcing the mixture from the mixing block 1 and also cleaning the associated cylinder 6. To prevent the air supplied by the auxiliary air line 48 exhausting to the atmosphere, an exhaust outlet 49, of the auto valve 25 is provided with the solenoid operated valve 44 actuated upon the opening of the auxiliary air line 48.

When all the liquid has been exhausted into a mould, the let-down valve 24 is closed, air is exhausted from the cylinder 6 containing the piston 10, and the solenoid operated valve 44 controlling the exhaust of the auto valve 25 is reversed.

The isolating piston 15 is then withdrawn and, by way of manual controls, the let-down valve 24 is opened and an air blast is employed to purge the block 1 via the associated pressure operated non-return valve 21. Periodic shots of solvent from a line 50 are also employed to assist the purging.

It will be seen from the above description that the apparatus is suitable for dispensing and mixing small amounts of ingredients (10–150 grams) because it is capable of dispensing accurately such small amounts, of homogeneously mixing in about 2 to 3 seconds, of quickly evacuating the foam mixture from the mixer, of a high speed of operation, and of being cleaned in a convenient manner. However, an apparatus generally as described above may be used for mixing large amounts of ingredients. It is possible to mechanically operate the mixing pistons for handling larger amounts of ingredients.

FIGURE 3 shows a modification of FIGURE 1 in which piston 11 has a rod 51 connected to pneumatic actuating device 52 supplied with compressed air by line 53.

I claim:

1. An apparatus for mixing material, for example, ingredients for the manufacture of urethane foam, comprising: a mixing device containing two chambers having adjacent ends interconnected with one another by wall means defining a plurality of openings through said adjacent ends and two pistons each slidably mounted in a respective one of the chambers; means for oscillating the pistons within the chambers to force ingredients in the mixing device back and forth through the openings to effect mixing of the ingredients, said wall means defining a discharge passage having a control valve interposed therein with which passage the openings communicate whereby the mixed ingredients may be discharged by convergence of the pistons with the wall with the valve open; the wall also including means defining an inlet passage communicating with the openings for charging the mixing device.

2. An apparatus as in claim 1 wherein the inlet passage extends at right angles to the openings through the wall.

3. An apparatus as claimed in claim 1 wherein the outlet passage extends at right angles to the openings through the wall.

4. An apparatus as claimed in claim 1 wherein the outlet passage contains a valve; and further including pneumatic means for operating the last-mentioned valve.

5. An apparatus as claimed in claim 1 including means for supplying compressed air alternately to an end-facing surface of each of the pistons remote from the openings, whereby said pistons are oscillated.

6. An apparatus as in claim 1 including means for supplying compressed air alternately to an end facing of each of the pistons remote from the openings, to oscillate said pistons, each chamber incorporating a pressure release valve to exhaust the pressure behind the associated piston when it is displaced away from the openings.

7. An apparatus as claimed in claim 1 wherein the mixing device is connected to polyol dispensing means and diisocyanate dispensing means, and wherein both dispensing means comprise: a piston and cylinder arrangement, a pipe line inter-connecting the piston and cylinder arrangement and a pressure operated non-return valve which communicates with the mixing device.

8. An apparatus as claimed in claim 1 wherein the mixing device is connected to polyol dispensing means and diisocyanate dispensing means, and wherein both dispensing means comprise: a piston and cylinder arrangement, a pipe line interconnecting the piston and cylinder arrangement and a pressure operated non-return valve which communicates with the mixing device and wherein catalyst dispensing means communicate with the polyol pipe line for dispensing at least one catalyst into that pipe line.

9. An apparatus as claimed in claim 1 wherein the mixing device is connected to polyol dispensing means and diisocyanate dispensing means, and wherein both dispensing means comprise: a piston and cylinder arrangement, a pipe line inter-connecting the piston and cylinder arrangement and a pressure operated non-return valve which communicates with the mixing device and wherein catalyst dispensing means communicate with the polyol pipe line for dispensing at least one catalyst into that pipe line, the catalyst dispensing means comprising, for each catalyst, a piston and cylinder arrangement connected to the polyol pipe line by a pressure operated non-return valve.

10. An apparatus as claimed in claim 1 wherein said wall comprises a central apertured plate and an outer annular portion, of increasing thickness in the radial direction, containing means defining transverse passages, a radially extending inlet passage and a radially extending outlet passage.

11. An apparatus as claimed in claim 1, wherein each piston has an end surface facing the wall, each last-mentioned surface having a configuration such that each last-mentioned surface may engage the wall substantially throughout the extent of said last-mentioned surfaces.

12. An apparatus as in claim 1 wherein ports are provided in the inlet passage and including a piston slidably mounted in the inlet passage to open communication between said ports and said openings in one position of the piston, and to close communication between said ports and said openings in another position of the piston.

13. An apparatus as in claim 12 further including pneumatic means operable to slide the last-mentioned piston between said one position and said other position.

14. An apparatus as claimed in claim 1 wherein the mixing device is connected to polyol dispensing means and diisocyanate dispensing means, and wherein both dispensing means comprise: a piston and cylinder arrangement, a pipe line interconnecting the piston and cylinder arrangement, and a pressure operated non-return valve which communicates with the mixing device, wherein ports are provided in the inlet passage to open communication between said ports and said openings in one position of the piston, and to close communication between said ports and said openings in another position of the piston and wherein two of said ports communicate respectively with the polyol non-return valve and the diisocyanate non-return valve.

15. An apparatus as in claim 14 wherein a further of said ports is connected to means for supplying compressed air whereby the mixing device may be cleaned.

16. An apparatus as in claim 14 wherein the further port is also connected to solvent supply means.

References Cited
UNITED STATES PATENTS

| | | | |
|---|---|---|---|
| 2,312,639 | 3/1943 | Gronemeyer | 259—4 |
| 2,764,565 | 9/1956 | Hoppe et al. | 260—2.5 |
| 2,813,300 | 11/1957 | Hausman | 18—2 |
| 2,948,920 | 8/1960 | Hausman | 18—2 |
| 3,012,977 | 12/1961 | Wilson et al. | 260—2.5 |
| 3,031,271 | 4/1962 | Weinbrenner et al. | 23—252 |
| 3,063,813 | 11/1962 | Weinbrenner et al. | 23—252 |
| 3,111,389 | 11/1963 | Hansen et al. | 23—252 |
| 3,140,078 | 7/1964 | Krahe et al. | 259—98 X |

JOSEPH SCOVRONEK, *Primary Examiner.*

DONALD E. CZAJA, *Examiner.*